Patented Nov. 16, 1948

2,453,738

UNITED STATES PATENT OFFICE 2,453,738

MODIFIED CYANINE DYES

Alfred W. Anish, Vestal, N. Y., assignor to General Aniline & Film Corporation, New York, N. Y., a corporation of Delaware No Drawing. Application September 7, 1946, Serial No. 695,559

10 Claims. (Cl. 260—304)

This invention relates to new alkylating or quaternizing agents and to a process of preparing the same.

Sensitizing dyes used with silver-halide emulsions must not only provide the desired sensitivity, but must meet other requirements chief of which are non-diffusibility in the emulsion and solubility in liquids used for adding the dye to the emulsion. A dye selected for its sensitizing power need not and usually does not have such other prerequisites.

It is known that variations of the structure of a sensitizing dye lead to changes in its sensitizing characteristics. Hence, if a dye be satisfactory from the standpoint of its sensitivity, but deficient from the standpoint of solubility or diffusibility, and it is attempted to cure the deficiency by the introduction of substituents changing the dye molecule, a modification of the sensitizing characteristics necessarily ensues.

It is recognized in the art that the greater the molecular weight of a product, the lower its solubility; discounting, of course, the presence of solubilizing groups. Hence, if a sensitizing dye is deficient from the standpoint of diffusibility and satisfactory from the standpoint of solubility a change in the size of the molecule to cure the deficiency causes a lessening of solubility.

It is also a truism that the characteristics of a cyanine dye will not vary greatly if the aliphatic atom grouping attached thereto is varied within limits. Thus, it is possible to use interchangeably the low molecular weight aliphatic radicals ranging up to say 4 carbon atoms without a material modification of the properties of the dye. However, if this limit be exceeded to increase the size and hence the non-diffusibility of the dye as a whole, then again we find that the dye has undergone a marked departure in properties from those of the original.

I have now discovered that by introducing one or two methylene groups between a p-toluenesulfonate group and a nitrogenous heterocyclic system, compounds are obtained which, when utilized as alkylating or quaternizing agents for basic nitrogenous heterocyclic dye intermediates usually employed in the production of sensitizing dyes, yield dye salt intermediates which undergo the usual reactions for the preparation of cyanine dyes. These dyes are characterized not only by their speed and gradation but also by non-diffusing properties in multilayer films without any sacrifice in solubility.

It is an object of the present invention to provide a new class of alkylating or quaternizing agents for basic nitrogenous heterocyclic intermediates usually employed in synthesizing cyanine dyes.

A further object involves a method of preparing such quaternizing agents.

Other objects and advantages of this invention will become apparent by reference to the following specification in which its preferred details and embodiments are described.

I have found that when an aromatic primary amino compound, containing in addition a hydroxy, mercapto, or selenyl group in the ortho-position, is heated with glycolic or hydracrylic acid, azoles are obtained, which upon further treatment with p-toluenesulfonyl chloride, yield azole toluenesulfonic acid esters, which are excellent alkylating or quaternizing agents for basic heterocyclic nitrogenous intermediates usually employed in cyanine drugs.

The alkylating or quaternizing agents prepared according to the present invention are characterized by the following general formulae:

(1) 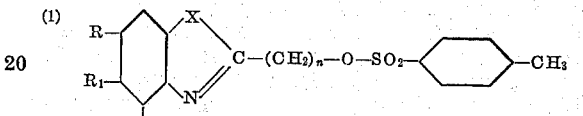

(2) 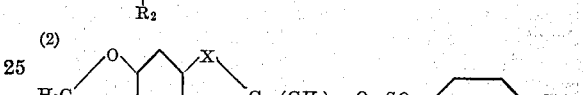

wherein R represents hydrogen, an aliphatic radical such as an alkyl group, e. g., methyl, ethyl, propyl, butyl, and the like, alkoxy, e. g., methoxy, ethoxy, propoxy, etc., halogen, e. g., chlorine or bromine, or anilino group, $R_1$ represents either hydrogen, a halogen, or an aliphatic radical of the same value as R, $R_2$ represents either hydrogen or an aliphatic group of the same value as R, X represents either oxygen, sulfur or selenium, and $n$ represents a numeral ranging from 1 to 2.

The aromatic primary amino compounds containing a hydroxy, mercapto or selenyl group in the ortho-position and utilized as starting materials for the preparation of the above alkylating or quaternizing agents are represented by the following general formulae:

(3) 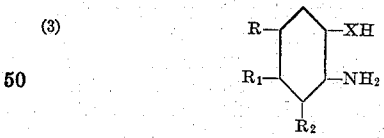

(4) 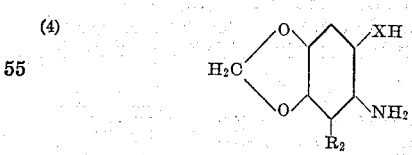

wherein R, $R_1$, $R_2$, and X have the same values as above.

As representative examples of suitable compounds represented by the above formulae (3) and (4) may be mentioned: 2-aminophenol, 2-aminobenzenethiol, 2-aminobenzeneselenol, 2-amino-5-methoxyphenol, 2-amino-5-ethoxybenzenethiol, 2-amino-4,5-dimethoxybenzenethiol, 2-amino-5-anilinobenzenethiol, 2-amino-5-chlorobenzenethiol, 2-amino-4,5-methylenedioxybenzenethiol, 2-amino-3-methylbenzenethiol, and the like.

In preparing the quaternizing agents of the present invention, a molecular equivalent of an aromatic primary amine represented by formula (2) is heated with a slight excess of a molecular equivalent of glycolic or hydracrylic acid represented by the general formula:

$$HO-(CH_2)_n-COOH$$

wherein $n$ represents a numeral ranging from 1 to 2, at a temperature ranging from 120°–155° C., for several hours. The methods of isolating the resulting product vary with the nature of the aromatic primary amino compound and the organic acid employed in the condensation reaction. In the case where the reaction mixture consists of an o-aminobenzenethiol, or o-aminobenzeneselenol and glycolic acid, the product is isolated by diluting the reaction mixture with water at room temperature, and a sufficient quantity of a mild oxidizing agent such as a 3% solution of hydrogen peroxide, aqueous solution of NaOH-potassium ferricyanide, sodium peroxide, sodium perborate, oxygen, etc., is added until a solid precipitate ensues. The purpose of the oxidizing agent is to convert the unreacted benzenethiol or benzeneselenol to the insoluble disulfide or diselenide. The precipitate is separated from the liquid portion of the reaction mixture, redissolved in a minium amount of 3N sodium hydroxide solution, in which the 2-hydroxymethylazole is soluble, and the solution treated with a small quantity of charcoal, and the compound reprecipitated carefully by the addition of a 10% solution of acetic acid. An additional fraction of the final product may be obtained from the filtrate by salting-out with sodium chloride.

Where the reaction mixture consists of an aminobenzenethiol or aminobenzeneselenol, and hydracrylic acid, the unreacted portion of the aminobenzenethiol or aminobenzeneselenol, is extracted with a 4 to 10% solution of sodium hydroxide in which the final product is insoluble, the extract rendered slightly acid, and the insoluble portion extracted with a water immiscible solvent such as ethyl ether, petroleum ether, benzene, and the like. The residue remaining after distilling off the ether is then subjected to a fractional distillation. The distillate obtained above 150° C., and 2 mm. pressure is utilized in the reaction with p-toluenesulfonyl chloride.

In the case where an amino-phenol and glycolic or hydracrylic acid is used, the reaction mixture is extracted several times with ether, the extract dried with anhydrous sodium sulfate, and the ether distilled off. The oily residue remaining after distilling off the ether is subjected to a fractional distillation under reduced pressure. All of the distillate obtained above 150° C., at 2–3 mm. of pressure is mainly an alkylol-benzoxazole, and utilized as such in the reaction with the p-toluenesulfonyl chloride.

One mol of the product as above obtained is dissolved in a sufficient quantity of 8 N sodium hydroxide solution and the solution heated on a steam bath. To the hot solution, 1 mol of p-toluenesulfonyl chloride is added and the mixture allowed to stand at room temperature for 2 or more hours. The precipitated product is recovered by filtration, washed with water, the solid dried in air, and recrystallized from petroleum ether.

When a molecular equivalent of a 2-aminobenzenethiol is heated with a slight excess of a molecular equivalent of glycolic acid and the resulting 2-hydroxymethylbenzothiazole reacted with p-toluenesulfonyl chloride, two reactions occur which may be written as follows:

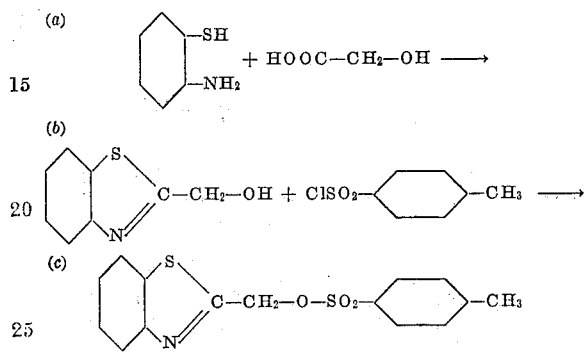

The toluenesulfonic ester (c) so prepared is then reacted with any one of the nitrogenous heterocyclic bases, usually employed in the synthesis of cyanine dyes, in the known manner, such as by heating in a sealed tube at a temperature ranging from 65° to 150° C. Another method comprises heating said ester and base at about 100° C., with a solvent-diluent, for a time sufficient for quaternization to take place.

The following examples describe in detail the method for preparing the quaternizing agents, but it is to be understood that they are presented merely for the purpose of illustration and are not to be construed as limitative.

*Example I*

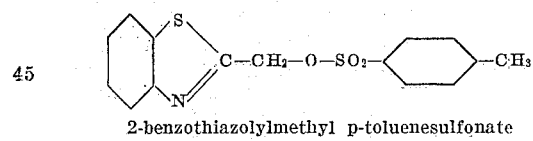

2-benzothiazolylmethyl p-toluenesulfonate

Sixty grams of 2-aminobenzenethiol and 42 grams of glycolic acid were heated together at 120°–155° C., for several hours. The mixture was poured into water at room temperature and 10 cc. of a 3% hydrogen peroxide solution added. The precipitate is separated from the liquid portion of the reaction mixture, redissolved in a minimum amount of 3 N sodium hydroxide solution and filtered. A small quantity of charcoal was added, the product reprecipitated carefully by the addition of a 10% solution of acetic acid, and the solid product recovered and dried.

Sixty grams of the product as above obtained is dissolved in 500 cc. of 8 N sodium hydroxide solution and the solution heated on a steam bath. To the hot solution 70 grams of p-toluenesulfonyl chloride was added and the mixture allowed to stand at room temperature for several hours. The precipitated product was cooled, filtered, washed with water, the solid dried in air, and recrystallized from petroleum ether.

*Example II*

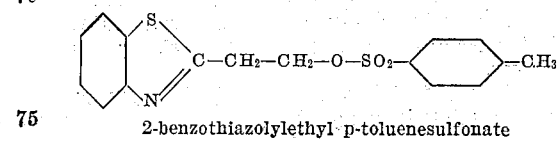

2-benzothiazolylethyl p-toluenesulfonate

Fourteen grams of 2-aminobenzenethiol and 11 grams of hydracrylic acid were heated together at 140°–155° C., for two hours. The gummy product, which is soluble in acid but insoluble in alkali, was extracted with a 5% solution of caustic soda so as to remove any unreacted 2-aminobenzethiol. The insoluble residue was extracted several times with ethyl ether, and the residue remaining after distilling off the ether was subjected to a fractional distillation above 150° C., and at 2 mm. pressure. The distillate obtained at 165°–170° C., at 3 mm. pressure, was a yellowish-brown oil.

The yellowish-brown oil obtained as above was then reacted with p-toluenesulfonyl chloride as in Example I.

*Example III*

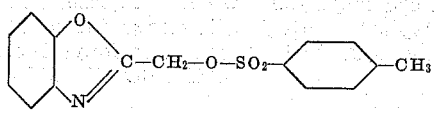

2-benzoxazolylmethyl p-toluenesulfonate

Fifty-four grams of 2-aminobenzenethiol and 42 grams of glycolic acid were heated together as in Example I. The reaction mixture was extracted several times with ether and then dried with anhydrous sodium sulfate. The residue remaining after distilling off the ether was subjected to fractional distillation under reduced pressure. The distillate obtained above 150° C., and at 2 mm. pressure, was mainly 2-hydroxymethylbenzoxazole.

The 2-hydroxymethylbenzoxazole as above obtained was then reacted with p-toluenesulfonyl chloride as in Example I.

While there have been pointed out above certain preferred embodiments of the invention, the same is not limited to the foregoing examples, illustrations or to the specific details given therein, but is capable of variations and modifications as to the reactants, proportions and conditions employed. Accordingly, it is intended that the invention be defined only by the accompanying claims, in which it is intended to include all features of patentable novelty residing therein.

I claim:

1. A compound of the class consisting of compounds having the following formulae:

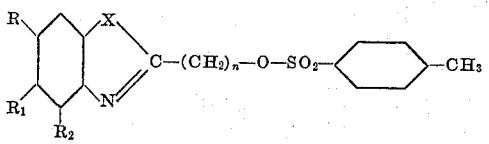

and

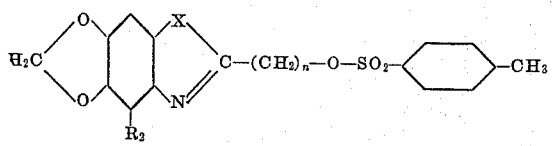

wherein R represents a member selected from the class consisting of hydrogen, halogen, aliphatic, and anilino groups, $R_1$ represents a member selected from the class consisting of hydrogen, halogen, and aliphatic groups, $R_2$ represents a member selected from the class consisting of hydrogen and aliphatic groups, X represents a member selected from the class consisting of oxygen, sulfur, and selenium, and $n$ represents a numeral ranging from 1 to 2.

2. A compound having the formula:

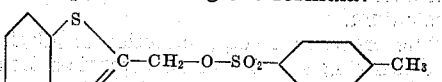

3. A compound having the formula:

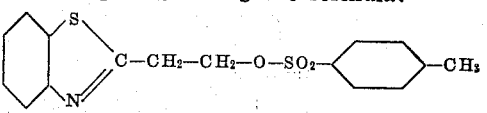

4. A compound having the formula:

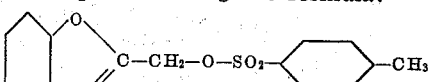

5. The process for the production of alkylating or quaternizing agents which comprises heating a compound of the class consisting of compounds having the following formulae:

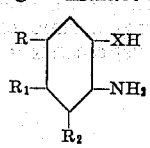

and

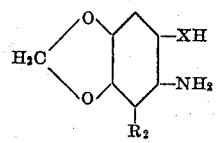

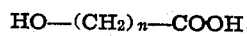

with a compound of the general formula:

$$HO-(CH_2)_n-COOH$$

and treating the resulting product with p-toluenesulfonyl chloride, wherein R represents a member selected from the class consisting of hydrogen, halogen, aliphatic, and anilino groups, $R_1$ represents a member selected from the class consisting of hydrogen, halogen, and aliphatic groups, $R_2$ represents a member selected from the class consisting of hydrogen and aliphatic groups, X represents a member selected from the class consisting of oxygen, sulfur, and selenium, and $n$ represents a numeral ranging from 1 to 2.

6. The process for the production of alkylating or quaternizing agents which comprises heating a compound of the class consisting of compounds having the following formulae:

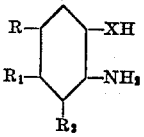

and

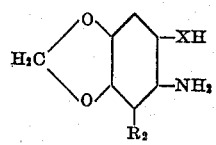

with glycolic acid and treating the resulting product with p-toluenesulfonyl chloride, wherein R represents a member selected from the class consisting of hydrogen, halogen, aliphatic, and anilino groups, $R_1$ represents a member selected from the class consisting of hydrogen, halogen, and aliphatic groups, $R_2$ represents a member selected from the class consisting of hydrogen and aliphatic groups, and X represents a member selected from the class consisting of oxygen, sulfur, and selenium.

7. The process for the production of alkylating or quaternizing agents which comprises heating a compound of the class consisting of compounds having the following formulae:

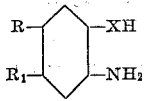

and

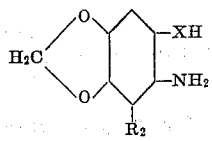

with hydracrylic acid and treating the resulting product with p-toluenesulfonyl chloride, wherein R represents a member selected from the class consisting of hydrogen, halogen, aliphatic, and anilino groups, $R_1$ represents a member selected from the class consisting of hydrogen, halogen, and aliphatic groups, $R_2$ represents a member selected from the class consisting of hydrogen and aliphatic groups, and X represents a member selected from the class consisting of oxygen, sulfur, and selenium.

8. The process for the production of alkylating or quaternizing agents which comprises heating 2-aminobenzenethiol with glycolic acid and treating the resulting product with p-toluenesulfonyl chloride.

9. The process for the production of alkylating or quaternizing agents which comprises heating 2-aminobenzenethiol with hydracrylic acid and treating the resulting product with p-toluenesulfonyl chloride.

10. The process for the production of alkylating or quaternizing agents which comprises heating 2-aminophenol with glycolic acid and treating the resulting product with p-toluenesulfonyl chloride.

ALFRED W. ANISH.

No references cited.